A. A. REASON.
FRICTION TRANSMISSION MECHANISM.
APPLICATION FILED DEC. 11, 1911.
1,052,692.
Patented Feb. 11, 1913.
2 SHEETS—SHEET 1.
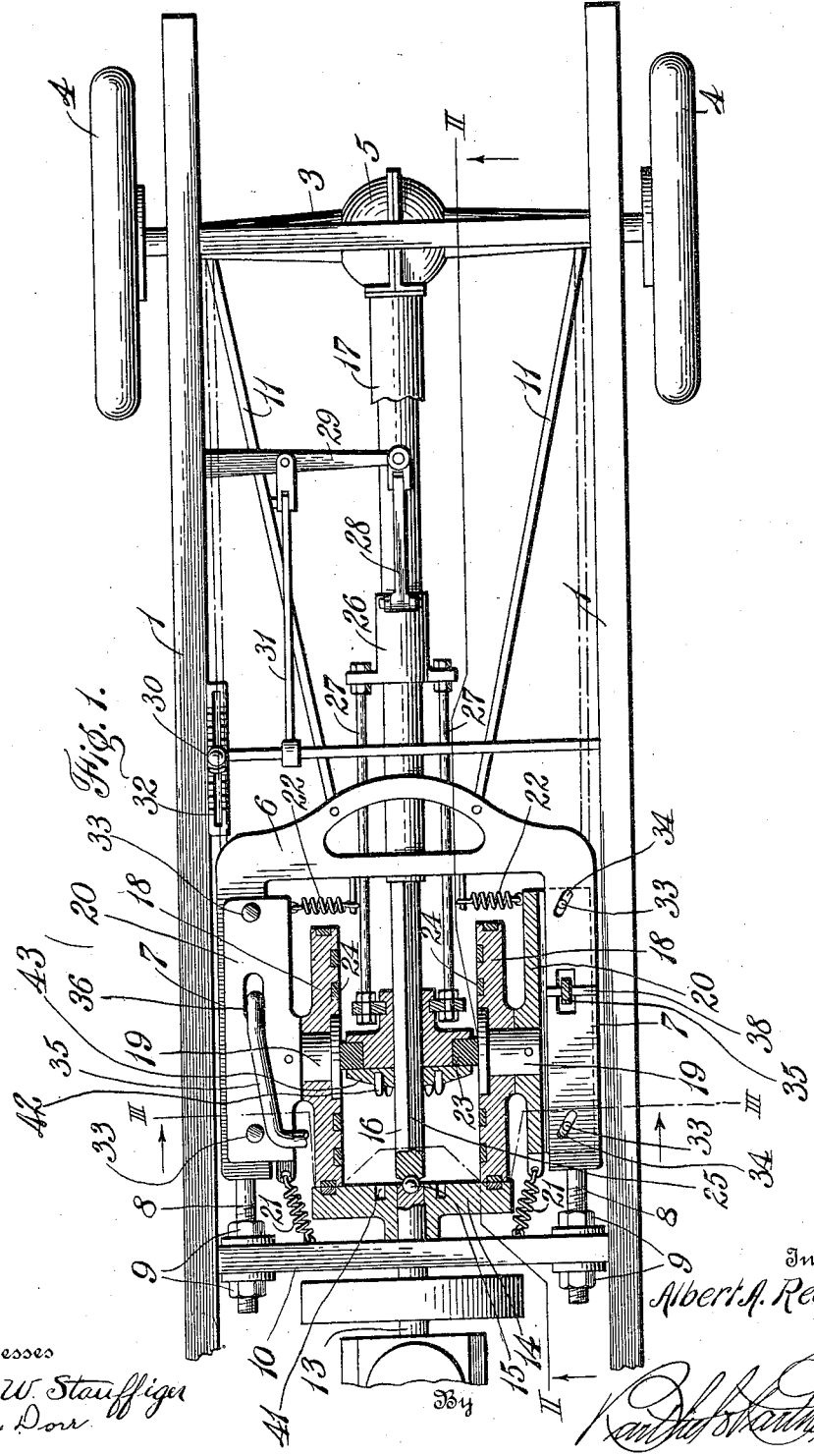
Witnesses
Chas. W. Stauffiger
A. M. Dorr
Inventor
Albert A. Reason,
By
Attorneys A. A. REASON.
FRICTION TRANSMISSION MECHANISM.
APPLICATION FILED DEC. 11, 1911.
1,052,692.
Patented Feb. 11, 1913.
2 SHEETS—SHEET 2.
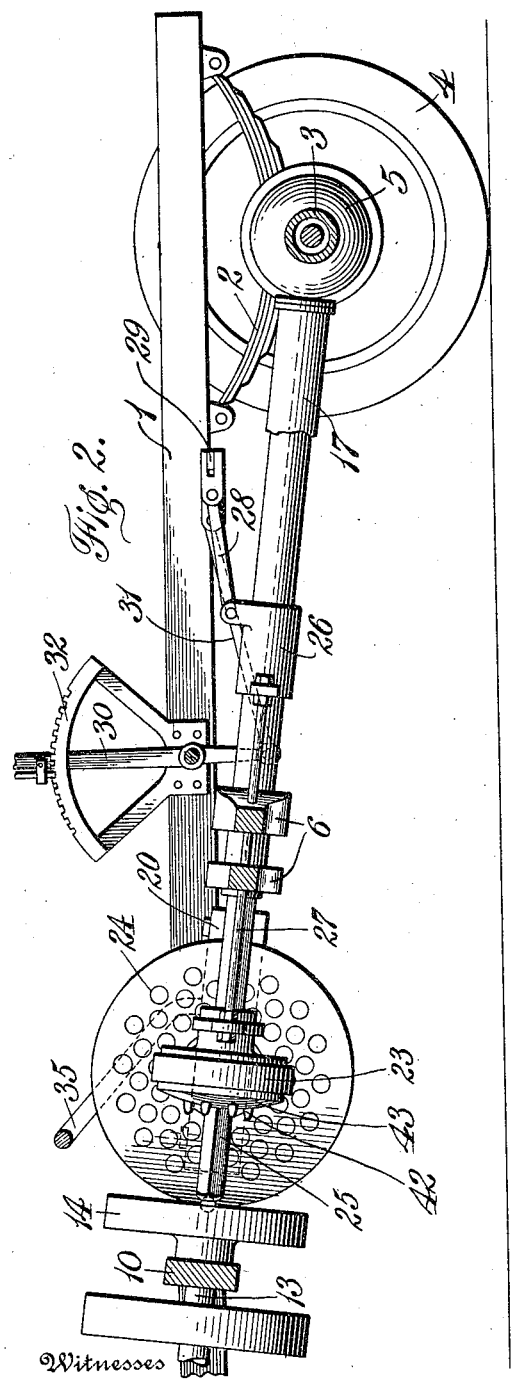
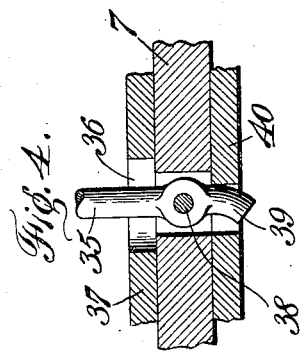
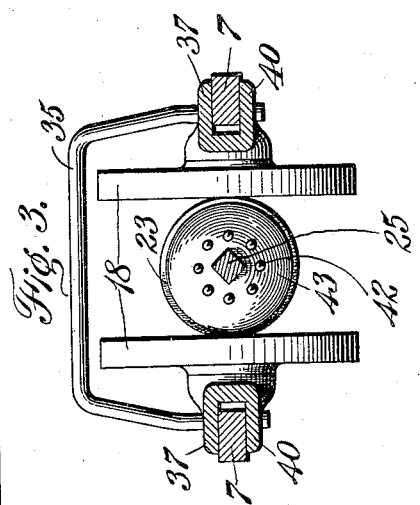
Witnesses
Chas. W. Stauffiger
A. M. Dorr
Inventor
Albert A. Reason
By
Attorneys

UNITED STATES PATENT OFFICE.

ALBERT A. REASON, OF PONTIAC, MICHIGAN, ASSIGNOR OF ONE-THIRD TO FLOYD REASON, OF DETROIT, MICHIGAN.

FRICTION TRANSMISSION MECHANISM.

1,052,692.  Specification of Letters Patent. Patented Feb. 11, 1913.

Application filed December 11, 1911. Serial No. 664,934.

*To all whom it may concern:*

Be it known that I, ALBERT A. REASON, a citizen of the United States of America, residing at Pontiac, in the county of Oakland and State of Michigan, have invented certain new and useful Improvements in Friction Transmission Mechanism, of which the following is a specification, reference being had therein to the accompanying drawings.

This invention relates to change speed transmission mechanism for automobiles or the like of the type known as the friction drive wherein change of speed and reversal of direction are obtained by shifting a follower member across the faces of driving members.

The invention also includes means for affording direct positive connection that permits slight angular displacement of the coupled parts.

The invention consists in the matters hereinafter set forth and more particularly pointed out in the appended claims.

In the drawings, Figure 1 is a plan view partially broken away and partially in section of a vehicle chassis equipped with a transmission mechanism that embodies features of the invention; Fig. 2 is a view in section taken on or about line 11—11 of Fig. 1; Fig. 3 is a view in detail through the transmission mechanism taken on or about line 111—111 of Fig. 1; and Fig. 4 is a sectional view in detail, enlarged, showing a release lever.

Referring to the drawing a chassis frame 1 of any preferred type is yieldingly supported near its rear by suitable springs 2 on a drive axle 3 with traction bearing wheels 4, the latter being coupled through any form of differential drive shaft common in the art and differential mechanism housed in the usual casing 5 of the axle.

A yoke 6 of suitable design and material to provide longitudinally disposed guide plates 7 is secured near its forward end as by studs 8 and thrust nuts 9 to a transverse member 10 of the chassis frame in such manner as to allow slight angular movement in a vertical plane of the rear of the yoke. Radius rods 11 connect the yoke with the axle 3.

A motor drive shaft 13, longitudinally disposed on the chassis carries a friction drive disk 14 on its outer end back of the transverse member 10 and has a ball thrust bearing indicated at 15 of any preferred type to receive the end of a transmission shaft 16 running to the rear axle and housed for at least a portion of its length in a tubular extension or arm 17 thereof. A pair of intermediate friction disks 18 are oppositely disposed in axial alinement on suitable bearing studs 19 mounted in bearing plates 20 that embrace and are movable on the guide portions 7 of the yoke. The peripheries of the disks 18 are normally held in contact with the driving face of the disk 14 as by springs 21 or the like that preferably slightly converge to aid rear springs 22 in drawing the bearing plates 20 forward and inward so as to keep the faces of the intermediate disks 18 in contact with a follower driving member 23. The faces of the studs 19 are flush with the inner faces of the disks 18, the latter preferably having inserts 24 of suitable material for increasing the holding qualities of the disks.

The follower drive member 23 is longitudinally and non-rotatably reciprocable on a squared portion 25 of the shaft 16 and may be shifted back and forth between the disks 18 by means of a collar 26 coupled by rods 27 to the disks and slidable on the rounded portion of the shaft 16 by means of a link 28, lever 29, shifting lever 30, and coupling rod 31, the lever 30 preferably operating in a ratchet quadrant 32. Or other suitable means may be used to shift the follower drive member 23.

The action of the springs 22 to draw the guide plates forward and together is assisted by guide pins 33 engaging obliquely disposed guide slots 34 in the yoke 6 so that any forward movement of the bearing plates insures their being forced toward each other. As the studs 19 are stationary, the shifting of the follower member 23 across their heads may be made easier by means of a pedal 35 having a pair of arms passing through slots 36 in the upper flange 37 of the bearing plates and rocking on a pivot pin 38 in the yoke with depending ends 39 that engage openings in the lower flanges 40 of the plates 20 so that forward movement of the upper portion of the pedal 35 forces the bearing plates backward and apart and the disks 18 out of contact with the periphery of the follower member 23.

The disk 14 is provided with sockets 41 that may be entered by pins or lugs 42 on the crowned or convexed face of a clutch plate 43 mounted on the follower drive member 23. By appropriate movement of the lever 30 the pins are made to enter the sockets and thereby afford positive or direct drive connection between the motor shaft 13 and the follower shaft 16, the convex face of the clutch permitting rocking of the shaft 16 without disconnecting the shafts.

By this construction, a friction drive is obtained, in which side thrust against the follower member is eliminated as the pressures are equal and in opposite directions, thereby minimizing loss of power through friction in the bearings and preventing undue or unequal wear. The mechanism permits angular deflection of the transmission shaft without affecting the operation of the parts and the flexible control with its dead center of motion when the follower driving member runs on to the bearing studs makes the vehicle to which such mechanism is attached absolutely responsive to the will of the operator.

Obviously, changes in the details of construction may be made without departing from the spirit of the invention and I do not care to limit myself to any particular form or arrangement of parts.

What I claim is:—

1. The combination with a drive axle, a transmission shaft extending transversely to the axle, a drive shaft, a thrust bearing between the adjacent ends of the shafts, a friction drive disk on the drive shaft, a longitudinally tiltable yoke, intermediate friction follower members rotatable and shiftable longitudinally of the yoke into operative contact with the drive disk, a follower drive disk non-rotatable and longitudinally shiftable on the transmission shaft yieldingly gripped by the intermediate follower disks, means for shifting the intermediate follower disks on the yoke, and means for shifting the follower drive disk across the faces of the intermediate disks.

2. The combination with a drive axle, of a drive shaft transverse to the axle, a transmission shaft extending from the axle to the drive shaft, a thrust bearing between the adjacent ends of the shafts, a yoke secured near one end and near the thrust bearing to tilt longitudinally, a friction drive disk on the main shaft adjacent the thrust bearing, bearing plates shiftable laterally and longitudinally on the yoke, a pair of intermediate follower friction disks each journaled on a bearing plate and adapted to contact with the face of the drive disk, a friction follower disk non-rotatable and longitudinally reciprocable on the transmission shaft between the intermediate follower disks in rolling contact with the proximate faces thereof, means for yieldingly holding the intermediate follower disks in contact with the main drive disk and the follower drive disk, means for shifting the follower drive disk across the faces of the intermediate disks, and means for positively moving the intermediate follower disks out of contact with the main driving disk and follower drive disk.

3. The combination with a drive axle, of a main drive shaft, a transmission shaft extending from the axle to the drive shaft, an end thrust bearing between the adjacent ends of the shafts, a yoke secured at its forward end near the main shaft to tilt longitudinally, bearing plates shiftable longitudinally and laterally on the yoke, a main drive disk on the drive shaft, a pair of follower disks each journaled on a bearing plate and adapted to have rolling contact with the face of the main drive disk, a follower drive disk non-rotatable and reciprocable longitudinally on the transmission shaft between the proximate faces of the intermediate follower disks, means for yieldingly forcing the bearing plates and disks thereon into operative relation to the main drive disk and the follower drive disk, and means for shifting the follower drive disk across the faces of the intermediate drive disks.

4. The combination with a drive axle, of a main drive shaft, a transmission shaft extending from the drive axle to the drive shaft, a thrust bearing between the adjacent ends of the shafts, a yoke secured near its forward end adjacent the thrust bearing with its rear end portion movable with the transmission shaft, a friction drive disk on the main shaft, intermediate friction follower members shiftable on the yoke into contact with the main driving disk, friction follower driving means on the transmission shaft adapted to be brought into rolling contact with the proximate faces of the friction follower intermediate driving means, means secured to the follower driving means adapted to positively engage with the main shaft driving means to rotate the follower driving means in unison therewith, means for yieldingly holding the intermediate follower driving means in operative relation with the main shaft driving means and the follower driving means, means for positively moving the intermediate follower means out of contact with the other friction driving means, and means for shifting the positive driving means in and out of engagement with the main friction driving means.

5. The combination with a drive axle, of a main drive shaft journaled transversely to the axle, a transmission shaft operatively connected to and supported at one end by the drive axle, an end thrust bearing between the other end of the transmission shaft and adjacent end of the drive shaft, a yoke secured at one end with the other end movable with the transmission shaft, a pair of guide plates shiftable laterally and longitudinally on the yoke, a main friction drive disk on the end of the drive shaft, a pair of intermediate friction follower disks each journaled on a bearing plate with the periphery adapted to contact with the face of the drive disk, a follower drive disk non-rotatable and movable longitudinally of the transmission shaft with its periphery adapted to contact with the proximate faces of the intermediate friction follower disks, means for yieldingly projecting the bearing plates to hold the follower disks thereon in operative contact with the main and follower drive disks, means for positively retracting the bearing plates to hold the intermediate follower disks out of contact with the friction drive disks, and means for shifting the friction follower drive disk on the transmission shaft across the faces of the intermediate follower disk.

6. The combination with a drive axle, of a main drive shaft journaled transversely to the axle, a transmission shaft operatively supported by and connected at one end to the drive axle, an end thrust bearing between the other end of the transmisison shaft and adjacent end of the drive shaft, a yoke secured at one end with the other end movable with the transmission shaft, a pair of guide plates shiftable laterally and longitudinally on the yoke, a main friction drive disk on the end of the drive shaft, a pair of intermediate friction follower disks each journaled on a bearing plate with the periphery adapted to contact with the face of the drive disk, a follower drive disk non-rotatable and movable longitudinally on the transmission shaft with its periphery adapted to contact with the proximate faces of the intermediate friction follower disks, means for yieldingly projecting the bearing plates to hold the follower disks thereon in operative contact with the main and follower drive disks, means for positively retracting the bearing plates to hold the intermediate follower disks out of contact with the friction drive disks, means for shifting the friction follower drive disk on the transmission shaft across the faces of the intermediate follower disks, and a gudgeon plate on the face of the follower friction disk adapted to be moved into rocking interlocking engagement with the face of the main friction disk.

7. The combination with a main shaft, of a transmission shaft alined therewith, a friction drive disk on the main shaft adjacent the transmission shaft, a pair of intermediate follower disks adapted to be moved into rolling contact with the face of the main drive disk, a follower drive disk non-rotatable and longitudinally reciprocable on the transmission shaft between the proximate faces of the intermediate disks, means for yieldingly holding the intermediate friction disks in rolling contact with both the drive disks, means for positively withdrawing the intermediate disks from contact with the other disks, means on the follower drive disk adapted to rock on the face of and to positively engage the main friction disk to rotate the shafts together, and means to shift the follower drive disk across the faces of the intermediate disks.

8. The combination with a main drive shaft and a transmission shaft in axial alinement therewith, of a main drive disk on the drive shaft, a pair of intermediate friction follower disks adapted to be moved into rolling contact with the face of the drive disk, a friction follower disk non-rotatable and longitudinally reciprocable on the transmission shaft between the intermediate disks, means for yieldingly holding the intermediate disks in rolling contact with the drive disks, a plate on the follower drive disk having pins projecting from a convex face that is adapted to rock on the main drive disk for entering sockets in the face of the latter when the follower drive disk is moved against the main drive disk, means for positively retracting the intermediate disks from contact with the other disks, and means for shifting the follower drive disk longitudinally of the transmission shaft.

9. The combination with a drive axle of a main drive shaft transverse to the axle, a transmission shaft operatively mounted at one end of the drive axle, a thrust bearing between the other end of the transmission shaft, and one end of the main shaft, a yoke tiltably supported at one end with the other end movable with the transmission shaft, a drive disk on the end portion of the main shaft adjacent the transmission shaft, bearing plates shiftable on the yoke, means for guiding the bearing plates obliquely inwardly and outwardly on the yoke, a pair of bearing studs secured in axial alinement on the adjacent faces of the bearing plates, intermediate friction follower disks rotatable each on a stud, a follower drive disk non-rotatable and longitudinally reciprocable on the transmission shaft, shiftable across the proximate faces and inner ends of the intermediate follower disks and the bearing studs, springs normally projecting the bearing plates to hold the intermediate disks against the main and follower drive disks, a pedal pivoted on the yoke and adapted to positively retract the bearing plates to hold the intermediate follower disks out of engagement with the drive disks, and means for shifting the follower drive disk on the shaft.

10. The combination with a drive axle of a main drive shaft transverse to the axle, a transmission shaft operatively mounted at one end of the drive axle, a thrust bearing between the other end of the transmission shaft and one end of the main shaft, a yoke tiltably supported at one end with the other end movable with the transmission shaft, a drive disk on the end portion of the main shaft adjacent the transmission shaft, bearing plates shiftable on the yoke, means for guiding the bearing plates obliquely inwardly and outwardly on the yoke, a pair of bearing studs secured in axial alinement on the adjacent faces of the bearing plates, intermediate friction follower disks rotatable each on a stud, a follower drive disk non-rotatable and longitudinally reciprocable on the transmission shaft, shiftable across the proximate faces of the intermediate follower disks and the ends of the bearing studs, springs normally projecting the bearing plates to hold the intermediate disks against the main and follower drive disks, a pedal pivoted on the yoke and adapted to positively retract the bearing plates to hold the intermediate follower disks out of engagement with the driving disks, a plate on the follower drive disk with convex face toward the main drive disk, pins on the convex face adapted to engage sockets in the face of the main driving disk, and means for shifting the follower drive disk across the faces of the friction follower disks and to throw the plate in and out of engagement with the main drive disk.

11. The combination with a drive axle of a main drive shaft transverse to the axle, a transmission shaft operatively mounted at one end of the drive axle, a thrust bearing between the other end and the main shaft, a yoke tiltably supported at one end with the other end movable with the transmission shaft, a drive disk on the end portion of the main shaft adjacent the transmission shaft, bearing plates shiftable on the yoke, means for guiding the bearing plates obliquely inwardly and outwardly on the yoke, a pair of bearing studs secured in axial alinement on the adjacent faces of the bearing plates, intermediate friction follower disks rotatable each on a stud, a follower drive disk non-rotatable and longitudinally reciprocable on the transmission shaft, shiftable across the proximate faces of the intermediate follower disks and the ends of the bearing studs, springs normally projecting the bearing plates to hold the intermediate disks against the main and follower drive disks, a pedal pivoted on the yoke and adapted to positively retract the bearing plates to hold the intermediate follower disks out of engagement with the driving disks, a plate on the follower drive disk with convex face toward the main drive disk, pins on the convex face adapted to engage sockets in the face of the main driving disk, a collar longitudinally reciprocable on the transmission shaft coupled to the follower friction disk, and a lever operatively connected to the collar to shift the latter longitudinally of the shaft.

12. The combination with a main drive shaft, of a transmission shaft in substantial alinement with the main shaft, a yoke secured at one end with the other end movable with the transmission shaft, a friction drive disk on the end of the drive shaft, a pair of oppositely disposed bearing plates movable laterally and longitudinally on the yoke, a pair of bearing studs secured in axial alinement each on a bearing plate, an intermediate follower drive disk on each stud adapted to be moved into rolling contact with the face of the friction drive disk, a friction follower disk non-rotatable and longitudinally reciprocable on the transmission shaft with its periphery normally contacting with the proximate faces and ends of the intermediate follower disks and studs, spring means normally projecting the bearing plates to hold the intermediate disks in operative contact with the drive disks, a member oscillatory on the yoke for positively retracting the bearing plates to hold the intermediate disks out of contact with the other disks, a plate on the follower drive disk adapted to be moved into interlocking and rocking contact with the face of the main drive disk, and a lever operatively connected to the follower drive disk to shift the latter and to move the plate in and out of engagement with the main drive disk.

In testimony whereof I affix my signature in presence of two witnesses.

ALBERT A. REASON.

Witnesses:
OTTO F. BARTHEL,
CHAS. W. STAUFFIGER.

---

Copies of this patent may be obtained for five cents each, by addressing the "Commissioner of Patents, Washington, D. C."